(12) United States Patent
Mignano

(10) Patent No.: US 7,658,274 B2
(45) Date of Patent: Feb. 9, 2010

(54) SWITCHER FOR PRODUCT SUPPLY LINES

(75) Inventor: Paolo Mignano, Correggio (Reggio Emilia) (IT)

(73) Assignee: Motor Power Company S.R.L., Castelnovo di Sotto (IT)

( * ) Notice: Subject to any disclaimer, the term of this patent is extended or adjusted under 35 U.S.C. 154(b) by 134 days.

(21) Appl. No.: 12/108,083

(22) Filed: Apr. 23, 2008

(65) Prior Publication Data

US 2008/0264759 A1    Oct. 30, 2008

(30) Foreign Application Priority Data

Apr. 27, 2007    (EP) .................................. 07425249

(51) Int. Cl.
*B65G 47/26* (2006.01)
(52) U.S. Cl. ...................... 198/442; 198/353; 198/355
(58) Field of Classification Search ................. 198/353, 198/355, 442, 594, 595, 587, 588
See application file for complete search history.

(56) References Cited

U.S. PATENT DOCUMENTS

| 3,193,078 | A | * | 7/1965 | Amenta et al. | ........... 198/419.1 |
| 4,147,248 | A | * | 4/1979 | Kurczak et al. | ............. 198/358 |
| 4,265,356 | A | * | 5/1981 | Glover | ....................... 198/444 |
| 4,616,745 | A | * | 10/1986 | Hartness | ..................... 198/442 |
| 4,723,649 | A | * | 2/1988 | Hartness et al. | ............. 198/442 |
| 5,161,665 | A | * | 11/1992 | Cragun | ........................ 198/448 |
| 5,174,430 | A | * | 12/1992 | Ebira | ...................... 198/418.5 |
| 5,944,165 | A | * | 8/1999 | Mannlein et al. | ............. 198/442 |
| 6,772,872 | B2 | * | 8/2004 | Spangenberg et al. | ....... 198/442 |
| 7,114,609 | B2 | * | 10/2006 | Christman et al. | ........... 198/442 |
| 7,210,568 | B2 | * | 5/2007 | Cull et al | ..................... 198/442 |
| 7,318,722 | B2 | * | 1/2008 | Drysdale | ..................... 425/534 |
| 7,416,072 | B2 | * | 8/2008 | Gosset | ........................ 198/429 |
| 7,461,734 | B2 | * | 12/2008 | Mignano | ..................... 198/442 |
| 7,607,531 | B2 | * | 10/2009 | Bonhomme et al. | ......... 198/452 |
| 2007/0181401 | A1 | | 8/2007 | Mignano | |

FOREIGN PATENT DOCUMENTS

| EP | 1 524 213 A1 | 4/2005 |
| EP | 1 816 093 A1 | 8/2007 |
| FR | 2 792 921 A1 | 11/2000 |

* cited by examiner

*Primary Examiner*—Douglas A Hess
(74) *Attorney, Agent, or Firm*—Pearne & Gordon LLP

(57) ABSTRACT

The invention relates to a switcher for product supply lines, which comprises a support frame (2), a guide channel (8) which is transversally mobile on the support frame (2) with respect to the advancing direction of the products being supplied in inlet. The switcher (1) comprises a telescopic channel (10), located at an end (9) of the guide channel (8), and being slidably mobile with respect thereto. The guide channel (8) is mobile by a support element (6), slidable on respective transversal portions (4, 5) of the support frame (2). The support element (6) is in turn activated by cooperation between a cursor (13), slidable on the support element (6), and a con rod (15), hinged both to the cursor (13) and to a fixed transversal portion (4) of the support frame (2). The guide channel (8) is further provided with a separator device (20) for controlled distancing of the products which are grouped during the input supply stage.

13 Claims, 4 Drawing Sheets

SWITCHER FOR PRODUCT SUPPLY LINES

The invention relates to a switcher for product supply lines.

The invention is particularly applicable to conveying machines and systems for conveying, movement and sorting of bottles, flagons, cans, brick-shaped containers and other packages, in particular of small dimensions, normally used in the food and drinks industry, and in the sector of chemical and/or pharmaceutical products.

As is known, these devices are especially used upstream of control and selection systems.

The products to be sorted advance on a conveyor belt or other support and are initially channeled into a guide conduit, rotatably constrained, at an end thereof, to the support structure on the product input side. The guide channel is thus caused to follow a circular trajectory about the point of constraint. A telescopic channel is hinged at the opposite end of the guide channel, which telescopic channel directs and accompanies the products into the respective output conduits.

The telescopic channel is contained internally of a quadrilateral structure located horizontally above the belt and having two parallel sides and two perpendicular sides at the edges of the belt.

The telescopic channel is powered by drive means, comprising a cursor, to which the telescopic channel is constrained, and a rod slidably connected to the two sides of the quadrilateral structure, which sides are parallel to the edges of the support belt along which rod the cursor runs.

The rod runs horizontally, nearing and distancing from the outlet conduits, so that the telescopic channel is lengthened or shortened.

The movement of the cursor along the rod produces a transversal movement of the telescopic channel with respect to the belt and consequently causes the guide channel to rotate, which guide channel, being connected to the telescopic channel, is forced to follow the movements thereof.

The operating principle for sorting the products is thus based on the contemporary transversal and longitudinal movement of the telescopic channel, commanded by the means for moving.

The means for moving further comprise mechanisms for managing the rod and cursor displacements, such as for example two electric motors located along two perpendicular sides of the quadrilateral structure which command two Archimedes screws.

A device of this type is very complex from the structural, constructional and applicational point of view.

To improve the systems for conveying, moving and sorting small-dimension products, a system for sorting the products, object of a European patent application by the same applicant, includes rotation of the whole guide channel of the supplied products in order to direct the products towards respective channels located downstream of the guide channel.

In this case, the guide channel is supported by a hinged structure to a support frame of the conveyor belt of the moving products. The structure is provided with respective linear motors the cursors of which are respectively hinged, the first rotatably to a con rod hinged to the frame, the second, solidly to the telescopic channel located downstream of the guide channel. The activation of the second cursor determines the lengthening or shortening of the telescopic channel in order to compensate for the distance between the guide channel and the various conveyor channels provided, as well as accompanying the products during their directing towards the conveyor channels. The movement of the first cursor determines the rotation of the con rod and the support structure of the guide channel in accordance with the direction the supplied products are to be sent in.

The applicant has noted that the system of movement and directing of the products, in the prior art, is not without drawbacks and can be improved in various ways, mainly in relation to the effort needed to displace the guide channel transversally, in the example rotate it, with respect to the sliding of the products being supplied, as well as in relation to the precision and accuracy of the transmission ratio between the sliding of the first cursor and the transversal displacement of the guide channel.

In particular, the applicant has noted that the movement system of the guide channel based on the cooperation between the first cursor, the con rod and the hinge point of the support structure to the support frame requires an intense effort on the part of the motor in order to set the whole structure in rotation.

In addition, given the complexity of the mechanism necessary for the rotation of the guide channel, it is particularly difficult to establish a precise correspondence between the angular position of the guide channel and the sliding of the first cursor along the support structure, requiring frequent interventions in order to correct and adjust the transmission ratio.

The objective of the present invention is to obviate the drawbacks encountered in the solutions adopted in the prior art.

A further aim of the present invention is to provide a switcher device for product supply lines which requires small forces for the transversal movement of the guide channel, as well as a device which simplifies and optimises the adjustment of the transmission ratio between the related components.

An aim of the present invention is to provide an alternative solution for a switcher for product supply lines, comprising the technical characteristics set out in one or more of the appended claims.

A preferred but non-limiting embodiment of the switcher for product supply lines will now be described purely by way of example, accompanied by the appended figures of the drawings, in which.

With reference to the figures of the drawings, 1 denotes the switcher for product supply lines of the present invention.

The switcher comprises a support frame 2 and a sliding plane 3 for advancing a plurality of small-dimension products, such as for example bottles, flagons, cans, brick-shaped containers and the like.

The sliding plane 3 preferably comprises a conveyor belt having the task of advancing the products being supplied. Alternatively the sliding plane 3 can be constituted by a fixed panel on which the products advance, pushed by other same products being supplied, or it can be a surface formed by rollers which by rotating cause the products to advance.

Figure 1:
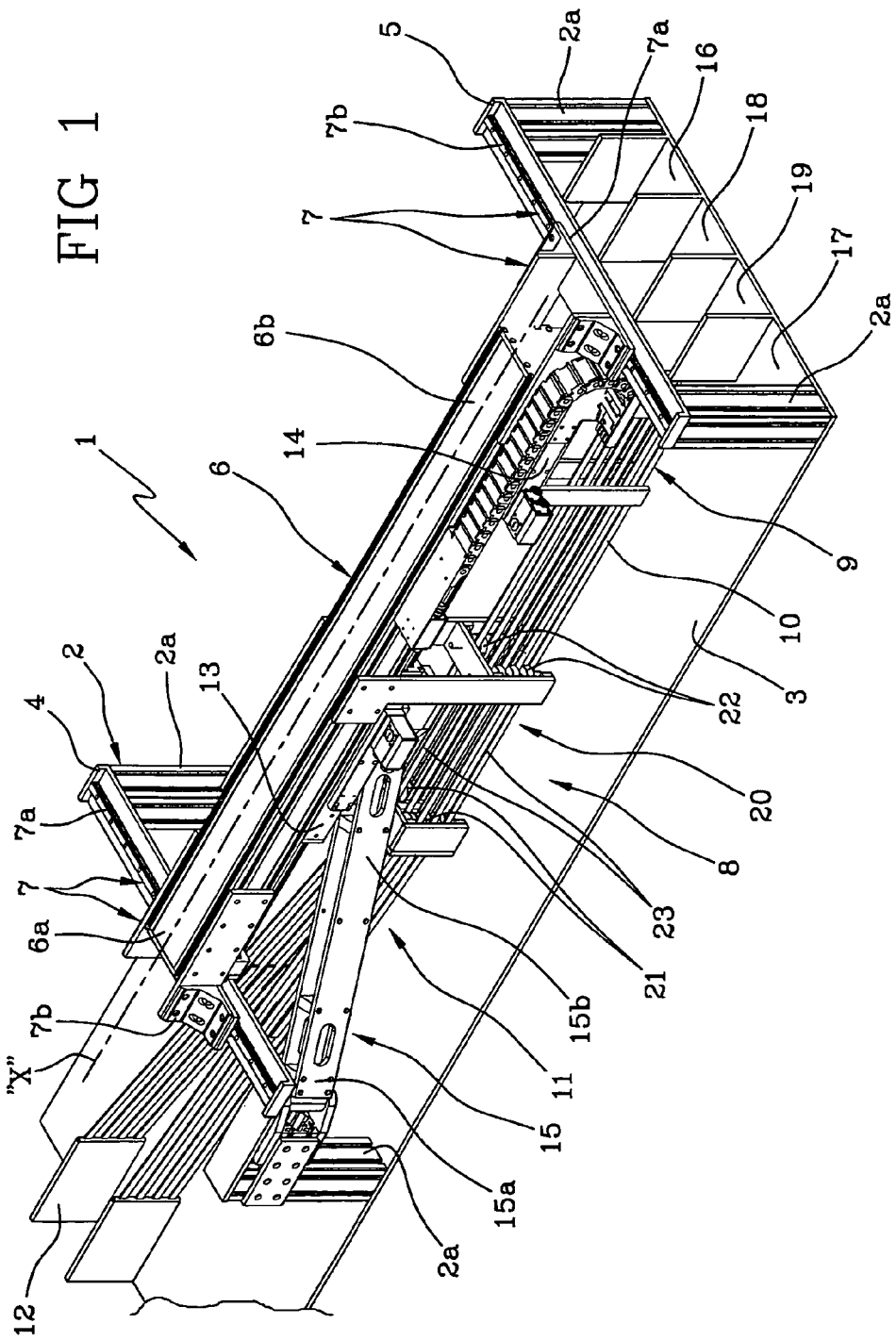
FIG. 1 is a perspective view from the left of a switcher for product supply lines, in agreement with the present invention.
Figure 2:
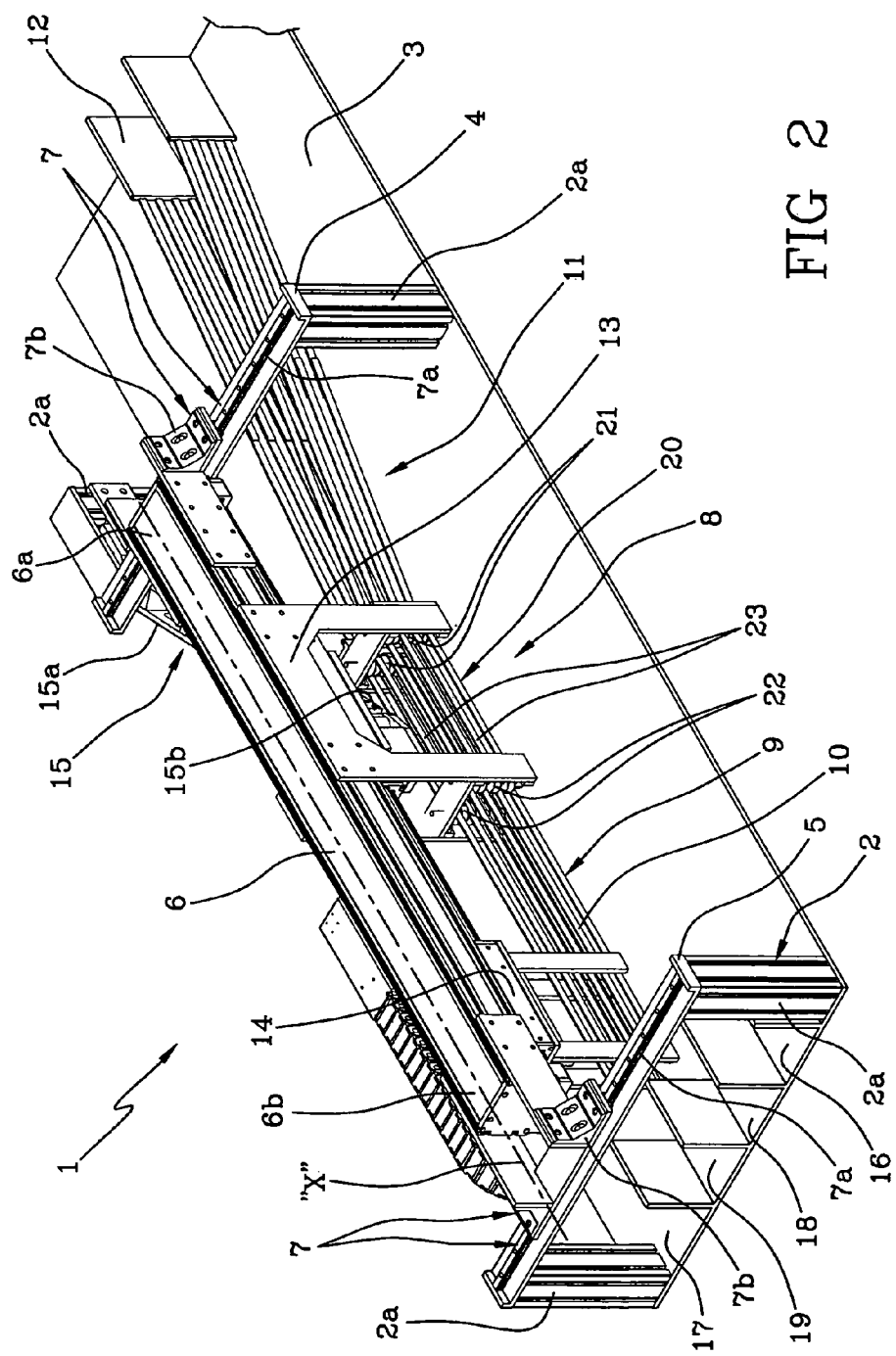
FIG. 2 is a perspective view from the right of the switcher of the preceding figure.
Figure 3:
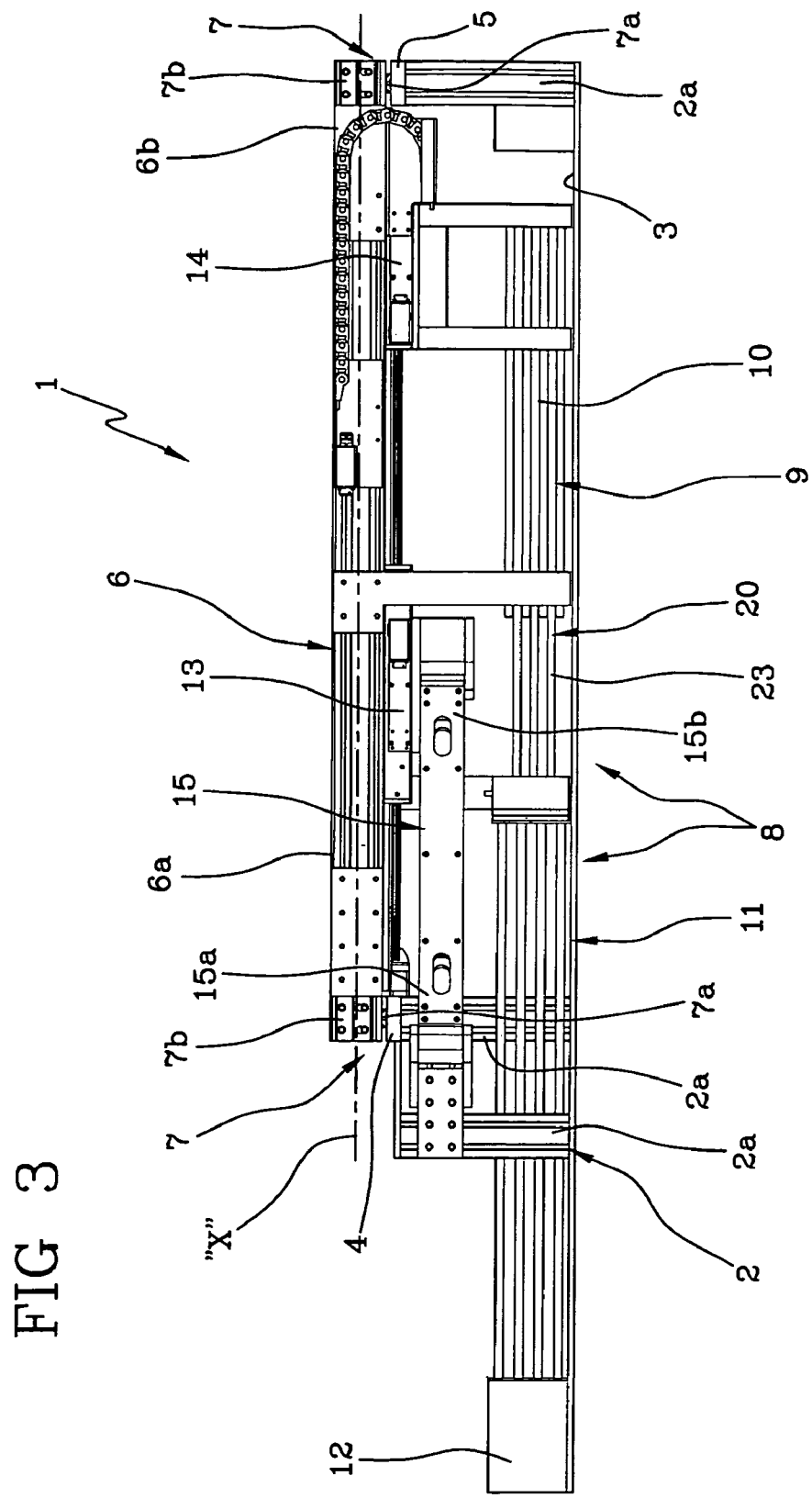
FIG. 3 is an elevation of the switcher of the preceding figures.

In FIGS. 1 and 2, the support frame 2 comprises four legs 2a (only partially represented for reasons of clarity) inferiorly joined to one another by respective stiffening bars (not illustrated).

The legs 2a are connected, two-by-two, to one another by a first 4 and a second 5 transversal portion of the support frame 2. The transversal portions 4, 5 preferably develop along respective and substantially straight directions, parallel to one another and substantially perpendicular with respect to the legs.

The switcher 1 further comprises a self-supporting support element 6 preferably exhibiting a longitudinal axis X having a substantially straight development, and operatively engaged to the first 4 and the second 5 transversal portions of the support structure 2.

In more detail, the support element 6 exhibits a first end 6a which is slidably engaged to the first transversal portion 4 of the support frame 2 and a second end 6b which is slidably engaged to the second transversal portion 5 of the frame 2, on which the support element 6 is mobile along the longitudinal development of the transversal portions 4, 5, transversally to the advancing direction of the products being supplied.

To ensure a mobile coupling between the support element 6 and the transversal portions 4, 5 of the support frame 2, the switcher 1 comprises, for each end 6a, 6b of the support element 6 at least a sliding guide 7. In other words, each sliding guide 7 is operatively interposed between the respective end 6, 6b of the support element 6 and the respective transversal portion 4, 5 of the support frame 2.

Each sliding guide 7 is preferably provided with at least a sliding rail 7a superiorly engaged on a respective transversal portion 4, 5 of the support frame 2 and at least a sliding skate 7b engaged at the respective end 6a, 6b of the support element 6, so that the skates 7b and the rails 7a are in a reciprocal sliding relation.

The switcher 1 further comprises a guide channel 8, connected to the support element 6, internally of which the products being supplied are advanced. The guide channel 8 is preferably constrained inferiorly of the support element 6.

The guide channel 8 advantageously exhibits a straight longitudinal axis and is aligned with the overlying support element 6. As the guide channel 8 is rigidly constrained to the support element 6, it follows all the movements thereof, translating together with the support element 6 along a parallel direction to the longitudinal development of the transversal portions 4, 5 of the support frame 2, transversally with respect to the sliding direction of the products being supplied.

At an end 9 of the guide channel 8 corresponding to the second end 6b of the support element 6, a telescopic channel 10 is located, constituting a prolongation of the guide channel at the end 9. Consequently the support element 6 is superposed and aligned to the telescopic channel 10, but is not rigidly connected thereto. The telescopic channel 10 is able to translate longitudinally with respect to the guide channel 8, sliding below the support element 6.

During the displacement of the support element 6, and therefore also the guide channel 8, the telescopic channel 10 can be extended, and can accompany the products right up to their destination, displacing forwards at preferably the same speed as the advancing speed of the products. After having reached its destination, the telescopic channel 10 returns into the rest position, where it is readied for a further displacement sequence.

An inlet end 11 of the supplied products is situated at the opposite end to the end 9 of the guide channel 8, the opposite end substantially corresponding to the first end 6a of the support element 6.

In more detail, the inlet end 11 extends inferiorly of the support element 6 beyond the first end 6a thereof, and rotatably engages with a supply channel 12 predisposed upstream of the guide channel 8.

To adapt to the displacements of the support element 6 with respect to the fixed supply channel 12, the inlet end 11 is advantageously telescopic so that it can lengthen or shorten according to the linear distance between the supply channel 12 and the part of the guide channel 8 which is mobile together with the support element 6.

The switcher 1 further comprises a first cursor 13 and a second cursor 14, both located contactingly above the support element 6. The first cursor 13 and the second cursor 14 are slidably mobile along the support element 6, activated by a motor, preferably a linear motor.

In particular, the support element 6, the first cursor 13 and the second cursor 14 constitute the linear motor.

In more detail, the support element 6 comprises a plurality of permanent magnets (not visible in the accompanying figures of the drawings) which are aligned along the longitudinal development thereof and are preferably positioned superiorly of the support element 6.

A coil (not illustrated) is located internally of each cursor 13 and 14, which coil interacts with the magnets of the support element 6 so that it moves together with its cursor 13 and 14.

The cursors 13 and 14 are longitudinally aligned along the support element 6, and the first cursor 13 is advantageously closer to the first end 6a of the support element 6, while the second cursor 14 is closer to the second end 6b of the support element 6.

A linear motor's functioning is based on the interaction between the induced magnetic field created by the current circulating internally of the coil and the magnetic field generated by the permanent magnets. Following the interaction of attraction and repulsion between the two magnetic fields, the coils internally of the cursors 13 and 14 slide on the support element 6. The telescopic channel 10 is constrained to the second cursor 14 which, sliding along the support element 6, causes the translation of the telescopic channel 10 and consequently the lengthening or shortening thereof.

Figure 4:
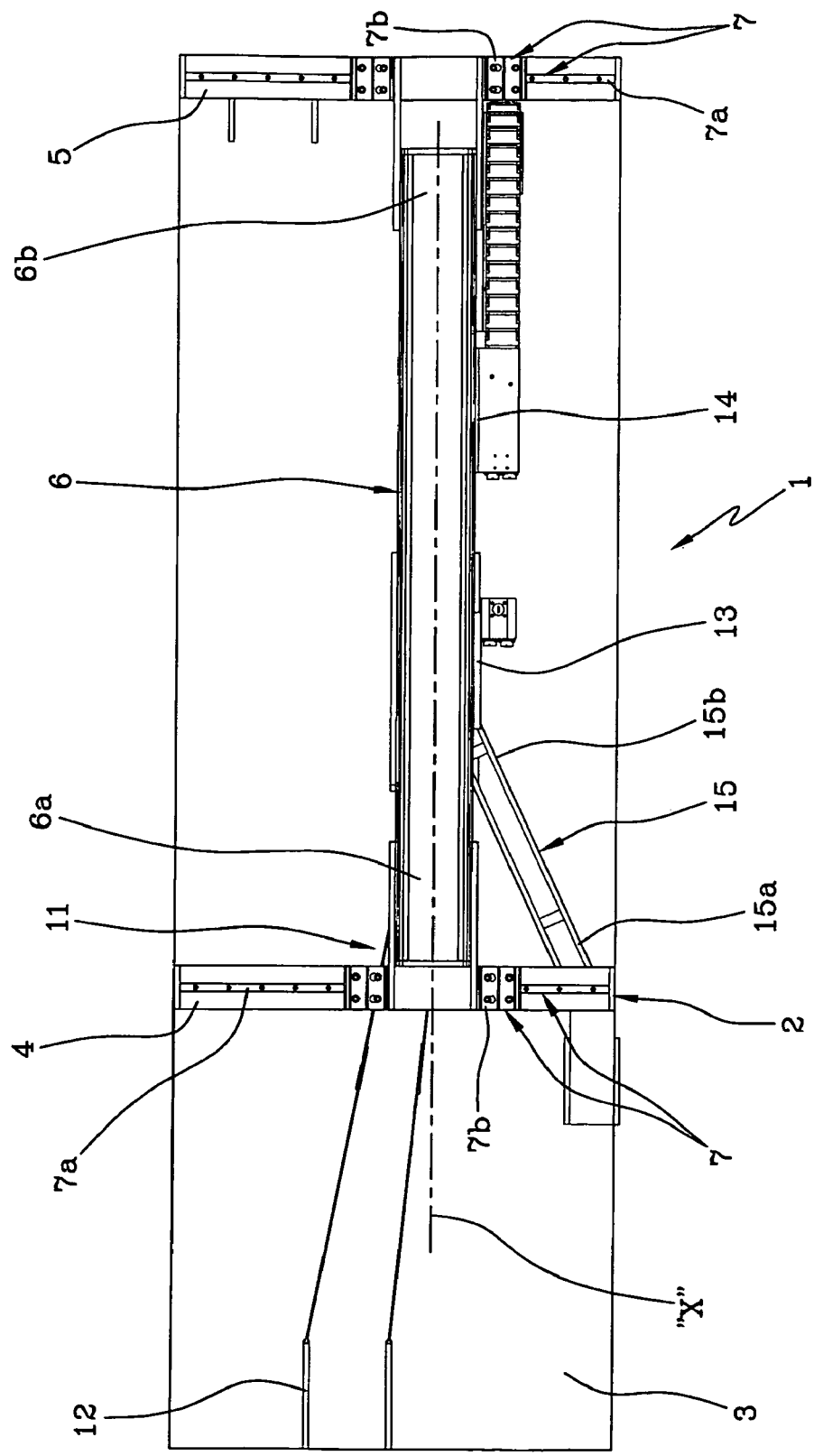
FIG. 4 is a plan view of the switcher of the preceding figures.

With reference to FIGS. 1, 2 and 4, a con rod 15 is located by the side of the support element 6, which con rod 15 has a first end 15a which is hinged, for example by means of a pin, to the first transversal portion 4 of the frame 2, and a second end 15b which is hinged to the first cursor 13.

The con rod 15 exhibits a longitudinal development which is smaller than the longitudinal development of the support element 6 and is inclined with respect to the longitudinal axis X of the support element 6.

In the structural configuration of the embodiment illustrated in the accompanying figures of the drawings, the con rod 15 is free only to rotate, without being able to translate. Therefore, as the con rod 15 is hinged both to the first transversal portion 4 of the support frame 2 and to the first cursor 13, slidably engaged on the support element 6, the con rod 15 moves the support element 6 when the first cursor 13 moves.

In more detail the first cursor 13 can slide along the support element 6 between a first position and a second position. In the first position, the second end 15b of the con rod 15 is neared to the first transversal portion 4 of the support frame 2 and the support element 6 is situated in the first position, i.e. with the guide channel 8 aligned with a first conveying or outlet channel 16 located downstream of the guide itself. When the cursor 13 is in the second position, the second end 15b of the con rod 15 is distanced from the first transversal portion 4 of the support frame 2 and the support element 6 is arranged in the second position, i.e. with the guide channel 8 aligned with a second conveying channel or outlet 17 which is substantially parallel to the first conveying channel 16.

The displacement of the first cursor 13 between the first and second positions causes the con rod 15 to rotate and consequently the support element 6 to translate by sliding along the transversal portions 4 and 5 of the support frame 2.

Naturally the displacement of the support element 6 between the first and the second positions determines a lateral displacement also of the guide channel 8 and the products advancing along it. The first cursor 13 makes a movement with respect to the frame which movement is caused by the composition of the straight movement along the support element 6 and the transversal displacement of the support element 6 along the transversal portions 4, 5, following a linear trajectory which is substantially inclined with respect to the longitudinal development of the support element 6.

The movement of the two cursors 13 and 14 is synchronised such as to lengthen or retract the telescopic channel 10, at the various conveying channels, which in the illustrated embodiment are preferably four in number, 16, 17, 18, 19, according to the displacement of the support element 6 along the transversal portions 4, 5 of the support frame 2.

The guide channel 8 is advantageously provided, inferiorly of the support element 6, with at least a separator device 20 for predefined distancing of the advancing products on the sliding plane 3. In other words, the separator device 20 is able to vary the advancing speed of the products in order to distance them from one another along a substantially parallel direction to the support element 6, and to enable the sensor means, preferably one or more photocells (not illustrated in the figures) associated to the support element 6 to detect consecutive passage thereof.

In order to predispose ordered rows of products interrelated with respective spaces for the photocells to detect the products, the separator device 20 is preferably situated downstream of the inlet end 11 of the guide channel 8, as the inlet end 11, by inclining with respect to the advancement direction of the products in order to adapt to the position of the support element 6, tends to group the products, forming a continuous row. The separator device 20 is preferably operatively interposed between the telescopic channel 10 and the supply channel 12 situated upstream of the guide channel 8.

The separator device 20 advantageously defines at least a central tract of the guide channel 8, located at a central zone of the support element 6.

In more detail, the separator device 20 comprises a first pair of rollers 21, which are each rotatable about a rotation axis which is substantially perpendicular to the sliding plane 3.

The rollers 21 of the first pair are distanced along a transversal direction to the product advancing direction, to define an inlet passage for the products coming from the inlet end 11.

The separator device 20 further comprises a second pair of rollers 22, which each rotate about a rotation axis which is substantially perpendicular to the sliding plane 3. The rollers 22 of the second pair are also distanced along a transversal direction to the product advancing direction, to define an outlet passage for the distanced products advancing towards the telescopic channel 10.

The device further comprises a pair of separation belts 23 of the products advancing on the sliding plane 3. Each belt 23 is partially wound about rollers 21, 22 of the first and second pair, such as to be substantially parallel to the product sliding direction.

The above-described switcher 1 is generally mounted on lines which sort products, or which perform filling operations, packaging operations or quality control operations of the products.

In particular, the lines can include a machine, not illustrated, for sorting the products. The machine generally comprises at least a supply line for the product, a plurality of outlet conduits and a switcher device 1 according to what is described with reference to the preferred configuration, placed between the supply line and the outlet conduits.

The switcher of the present invention obviates the problems encountered in the prior art, and offers important advantages.

A switcher for supply lines according to the present invention enables a considerable reduction in the effort needed to move the support element, which is not rotated but only has to perform a translation along the transversal portions of the support frame.

Also worthy of note is that the simplification of the mechanism for inducing the support element 6 to move permits accurate regulation of the transmission ration between the sliding of the first cursor, the rotation of the con rod, as well as the translation of the support element. In fact, the configuration of the above-described mechanism makes possible an immediate and accurate correspondence between the extension of the first cursor and the extension of the support element, as both must only perform simple translations.

Finally, the presence of the separator device enables an ordered arrangement of the products, intercalated with respective spaces, sufficient to enable detection by the sensors of the passage of each product.

The invention claimed is:

1. A switcher for product supply lines, comprising:
   a support frame (2),
   at least a guide channel (8) internally of which a plurality of products being supplied advance, the guide channel (8) being mobile with respect to the support frame (2) to direct the products being supplied towards respective conveying channels (16, 17, 18, 19),
   a telescopic channel (10), operatively associated to an end (9) of the guide channel (8), the telescopic channel (10) being slidably mobile with respect to the guide channel (8) in order to accompany the advancement of the products coming from the guide channel (8);
   a sliding plane (3) for the products moving internally of the guide channel (8) and the telescopic channel (10),
   a support element (6), operatively interposed between the guide channel (8) and the support frame (2), the support element (6) being mobile on the support frame (2) in order to displace the guide channel (8) at least between a first position, in which the products being supplied are directed towards a first conveying channel (16), and a second position in which the products are directed towards a second conveying channel (17);
   a first cursor (13) which is slidably mobile on the support element (6);
   a second cursor (14) which is slidably mobile on the support element (6) and which is connected to the telescopic channel (10);
   a con rod (15) having a first end (15a) which is hinged to a first transversal portion (4) of the support channel (2) and a second end (15b) which is hinged to the first cursor (13), characterised in that the support element (6) exhibits:
   a first end (6a) which is slidably engaged to the first transversal portion (4) of the support frame (2);
   a second end (6b) which is slidably engaged to a second transversal portion (5) of the support frame (2), the support element (6) being mobile along a longitudinal development of the first and the second transversal portion (4, 5) of the support frame (2) at least between the first position and the second position, transversally with respect to the sliding direction of the products being supplied.

2. The switcher of claim 1, further comprising, for each end (6a, 6b) of the support element (6), at least a sliding guide (7) which is substantially straight.

3. The switcher of claim 2, wherein each sliding guide (7) comprises:
   at least a sliding rail (7a) engaged on a respective transversal portion (4, 5) of the support frame (2);
   at least a sliding skate (7b) engaged on a respective end (6a, 6b) of the support element (6), the skate (7b) and the sliding rail (7a) being in a reciprocal sliding relation.

4. The switcher of claim 1, wherein the first cursor (13) is slidable along the support element (6) between a first position, in which the second end (15b) of the con rod (15) is near to the first transversal portion (4) of the support frame (2) and the support element (6) is arranged in the first position, and a second position, wherein the second end (15b) of the con rod (15) is distanced from the first transversal portion (4) of the support frame (2) and the support element is arranged in the first position, the displacement of the first cursor (4) between the first and the second positions setting the con rod (15) in rotation and the support element (6) in translation along the portions of transversal support (4, 5) of the support frame (2).

5. The switcher of claim 1, wherein the second cursor (14) is slidable along the support element (6) between a first position of minimum extension of the guide channel (8) and a second position of maximum extension of the guide channel (8).

6. The switcher of claim 1, wherein the guide channel (8) is provided with at least a separator device (20) for predefined spacing of products advancing on the sliding plane (3).

7. The switcher of claim 6, wherein the separator device (20) is operatively interposed between the telescopic channel (10) and a supply channel (12) located upstream of the guide channel (8) in the advancing direction of the products.

8. The switcher of claim 7, wherein the separator device (20) defines at least a tract of the guide channel (8).

9. The switcher of claim 7, wherein the separator device (20) comprises:
   a first pair of rollers (21), each rotatable about a rotation axis which is substantially perpendicular to the sliding plane (3), the rollers (21) of the first couple being distanced along a direction which is transversal to the advancing direction of the products, in order to define an inlet passage therefor;
   a second pair of rollers (22), each rotatable about a rotation axis which is substantially perpendicular to the sliding plane (3), the rollers (22) of the second pair being spaced along a direction which is transversal to the advancing direction of the products, in order to define an outlet passage;
   a pair of separating belts (23) which extend substantially parallel to one another, each separating belt (23) being partially wound about rollers (21, 22) of the first and second pairs, which rollers (21, 22) are aligned in a direction which is substantially parallel to the advancing direction of the products.

10. The switcher of claim 6, wherein the guide channel (8), the telescopic channel (10) and the separating device (20) are appended inferiorly of the support element (6).

11. The switcher of claim 1, wherein the support element (6) and the guide channel (8) exhibit a straight development.

12. The switcher of claim 1, wherein the telescopic channel (10) is an extension of the guide channel (8).

13. The switcher of claim 1, characterised in that the sliding plane (3) is positioned inferiorly of the guide channel (8), the telescopic channel (10) and the separator device (20).

* * * * *